United States Patent
Soliman

(10) Patent No.: US 12,177,240 B2
(45) Date of Patent: Dec. 24, 2024

(54) MACHINE LEARNING BASED INTRUSION DETECTION SYSTEM FOR MISSION CRITICAL SYSTEMS

(71) Applicant: iS5 Communications, Inc., Mississauga (CA)

(72) Inventor: Tamer Soliman, Toronto (CA)

(73) Assignee: iS5 Communications Inc., Ontario (CA)

( * ) Notice: Subject to any disclaimer, the term of this patent is extended or adjusted under 35 U.S.C. 154(b) by 0 days.

(21) Appl. No.: 18/115,208

(22) Filed: Feb. 28, 2023

(65) Prior Publication Data

US 2024/0080328 A1 Mar. 7, 2024

Related U.S. Application Data

(63) Continuation of application No. 16/570,386, filed on Sep. 13, 2019, now Pat. No. 11,621,970.

(51) Int. Cl.
*H04L 9/40* (2022.01)
*G06N 3/044* (2023.01)
*G06N 3/045* (2023.01)
*G06N 3/08* (2023.01)

(52) U.S. Cl.
CPC ......... *H04L 63/1425* (2013.01); *G06N 3/044* (2023.01); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 2,247,064 A * | 6/1941 | Nowak | H01B 3/447 524/522 |
| 7,610,375 B2 * | 10/2009 | Portolani | H04L 63/1425 709/224 |
| 7,797,411 B1 * | 9/2010 | Guruswamy | G06F 15/173 709/229 |
| 8,116,307 B1 * | 2/2012 | Thesayi | H04L 69/22 709/227 |
| 8,209,756 B1 * | 6/2012 | Guruswamy | H04L 63/12 713/188 |

(Continued)

OTHER PUBLICATIONS

Kashyap et al.; A DDos Attack Detection Mechanism Based on Protocol Specific Traffic Features; CCSEIT-12, Oct. 26-28, 2012, Coimbatore [Tamil Nadu, India] (Year: 2012).*

(Continued)

*Primary Examiner* — Kambiz Zand
*Assistant Examiner* — Mahabub S Ahmed
(74) *Attorney, Agent, or Firm* — Mark D. Penner

(57) ABSTRACT

The present invention is generally directed to the detection of an intrusion event in a computer network and a control network. More particularly, the present invention provides a system, framework, architecture, etc. for intrusion detection functions for network elements and control elements used in high demand and/or mission critical environments, including, but not limited to, power stations, sub-stations, intelligent transportation systems (ITS), rail, traffic control systems, chemical, oil & gas, critical manufacturing, and industrial applications.

37 Claims, 5 Drawing Sheets

(56) References Cited

U.S. PATENT DOCUMENTS

| | | | | |
|---|---|---|---|---|
| 8,291,495 | B1* | 10/2012 | Burns | H04L 63/168 |
| | | | | 713/153 |
| 9,300,554 | B1* | 3/2016 | Kosai | H04L 43/16 |
| 9,398,043 | B1* | 7/2016 | Yang | H04L 63/1441 |
| 10,326,676 | B1* | 6/2019 | Driggs | H04L 41/142 |
| 10,764,313 | B1* | 9/2020 | Mushtaq | G06N 20/00 |
| 11,038,906 | B1* | 6/2021 | Bingham | H04L 63/1425 |
| 11,349,861 | B1* | 5/2022 | Costlow | H04L 43/08 |
| 2003/0097470 | A1* | 5/2003 | Lapuh | H04L 69/18 |
| | | | | 709/239 |
| 2003/0145226 | A1* | 7/2003 | Bruton, III | H04L 63/0263 |
| | | | | 709/224 |
| 2003/0212909 | A1* | 11/2003 | Chandrashekhar | G06F 21/577 |
| | | | | 726/25 |
| 2004/0003094 | A1* | 1/2004 | See | H04L 43/026 |
| | | | | 709/227 |
| 2004/0034800 | A1* | 2/2004 | Singhal | H04L 63/1408 |
| | | | | 709/224 |
| 2005/0007951 | A1* | 1/2005 | Lapuh | H04L 45/645 |
| | | | | 370/225 |
| 2005/0256972 | A1* | 11/2005 | Cochran | G06F 11/2071 |
| | | | | 709/245 |
| 2006/0059163 | A1* | 3/2006 | Frattura | H04L 43/00 |
| 2006/0095968 | A1* | 5/2006 | Portolani | H04L 63/1416 |
| | | | | 370/245 |
| 2006/0156404 | A1* | 7/2006 | Day | H04L 63/1408 |
| | | | | 726/23 |
| 2007/0056038 | A1* | 3/2007 | Lok | H04L 63/1416 |
| | | | | 726/23 |
| 2007/0180526 | A1* | 8/2007 | Copeland, III | H04L 63/1416 |
| | | | | 709/224 |
| 2007/0214504 | A1* | 9/2007 | Milani Comparetti | |
| | | | | H04L 63/1408 |
| | | | | 726/23 |
| 2010/0094982 | A1* | 4/2010 | Budhia | G06F 9/5044 |
| | | | | 709/222 |
| 2010/0268933 | A1* | 10/2010 | Frattura | H04L 63/0428 |
| | | | | 713/151 |
| 2011/0055921 | A1* | 3/2011 | Narayanaswamy | |
| | | | | H04L 63/1458 |
| | | | | 726/22 |
| 2011/0178933 | A1* | 7/2011 | Bailey, Jr. | H04L 63/20 |
| | | | | 726/1 |
| 2014/0289856 | A1* | 9/2014 | Jiang | G06F 21/552 |
| | | | | 726/23 |
| 2014/0297572 | A1* | 10/2014 | Zambon | H04L 67/02 |
| | | | | 706/12 |
| 2015/0281276 | A1* | 10/2015 | U | H04L 63/10 |
| | | | | 726/1 |
| 2016/0277547 | A1* | 9/2016 | Kim | H04L 43/18 |
| 2017/0208011 | A1* | 7/2017 | Bosch | H04L 47/29 |
| 2017/0262567 | A1* | 9/2017 | Vassiliev | H03K 19/17736 |
| 2017/0279839 | A1* | 9/2017 | Vasseur | H04L 63/1425 |
| 2019/0044913 | A1* | 2/2019 | Tanida | H04L 47/2441 |
| 2019/0081983 | A1* | 3/2019 | Teal | H04L 47/2475 |
| 2020/0184148 | A1* | 6/2020 | Braunstein | G06V 30/414 |
| 2020/0186600 | A1* | 6/2020 | Dawani | H04L 67/1095 |
| 2020/0193305 | A1* | 6/2020 | Braunstein | G06F 40/205 |
| 2020/0220888 | A1* | 7/2020 | Terazawa | B60T 17/221 |
| 2020/0372154 | A1* | 11/2020 | Bacher | H04L 63/1408 |
| 2020/0382529 | A1* | 12/2020 | Higgins | H04L 63/1425 |
| 2021/0037043 | A1* | 2/2021 | Lee | H04L 63/1441 |

OTHER PUBLICATIONS

Patil et al.; Protocol Specific Multi-threaded Network Intrusion Detection System (PM-NIDS) for DoS/DDoS Attack Detection in Cloud; 9th ICCCNT Jul. 10-12, 2018, 2018, IISC, Bengaluru (Year: 2018).*

Moustafa et al.; An Ensemble Intrusion Detection Technique Based on Proposed Statistical Flow Features for Protecting Network Traffic of Internet of Things; IEEE Internet of Things Journal, vol. 6, No. 3, Jun. 2019 (Year: 2019).*

* cited by examiner

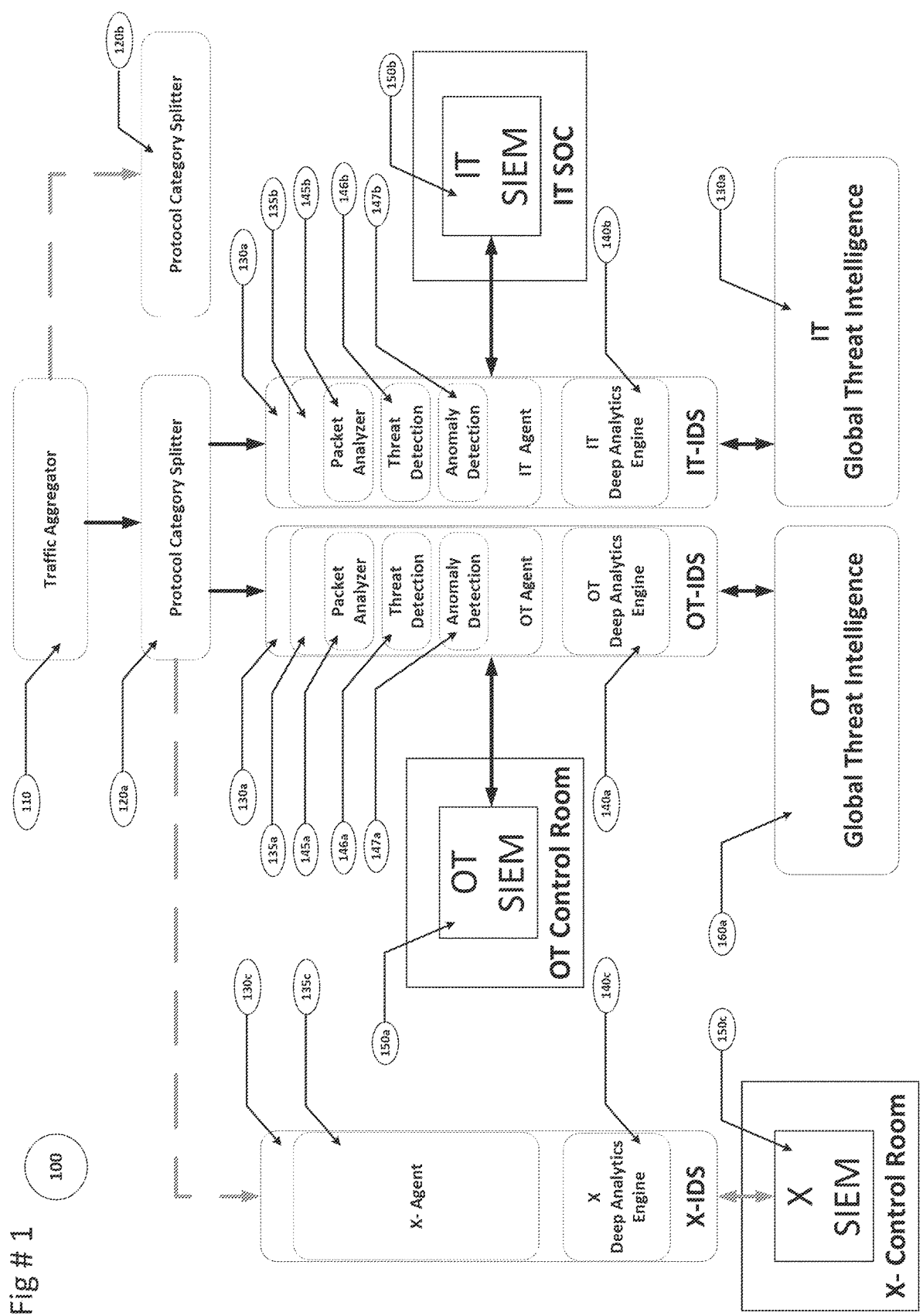
Fig #1

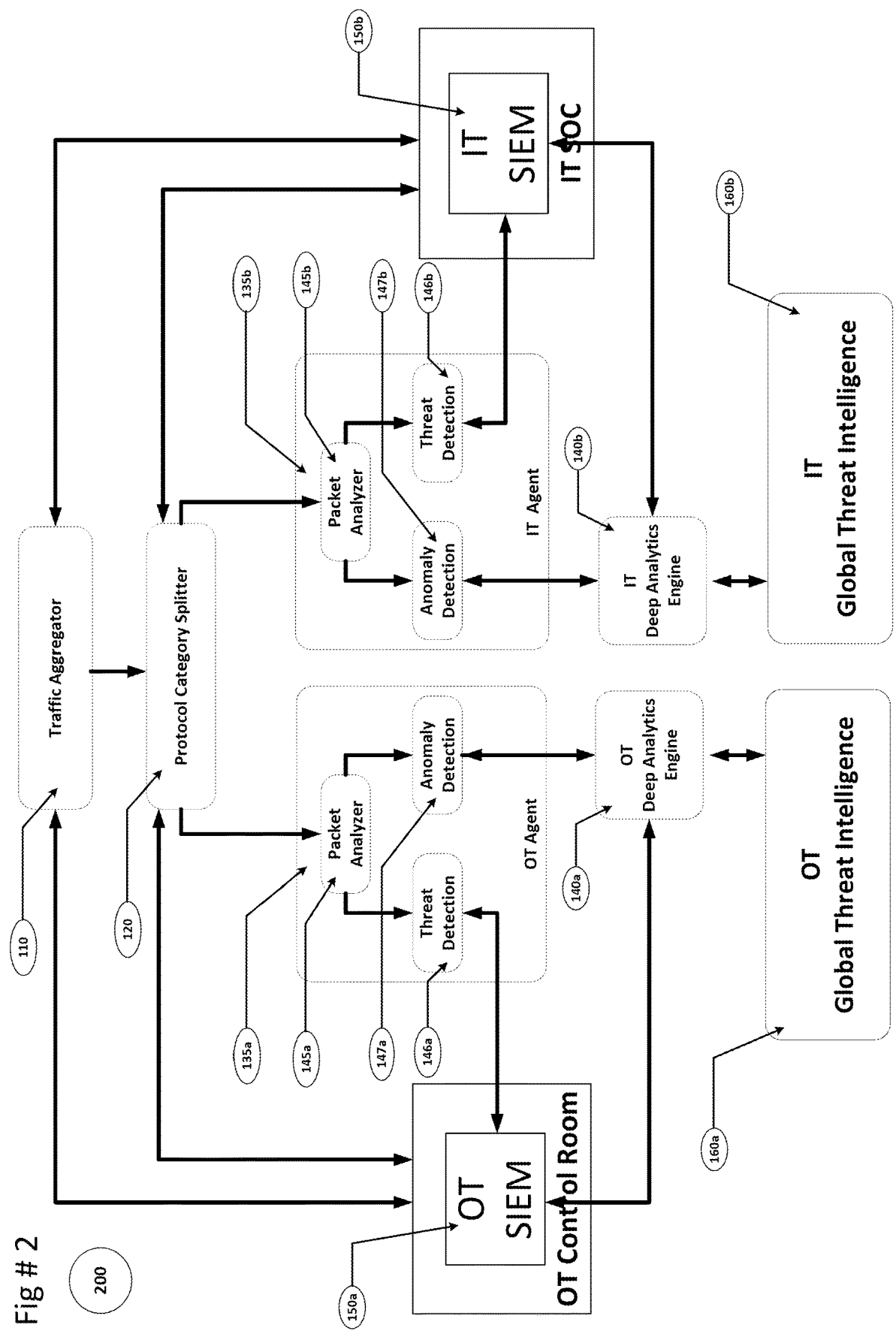
Fig # 2

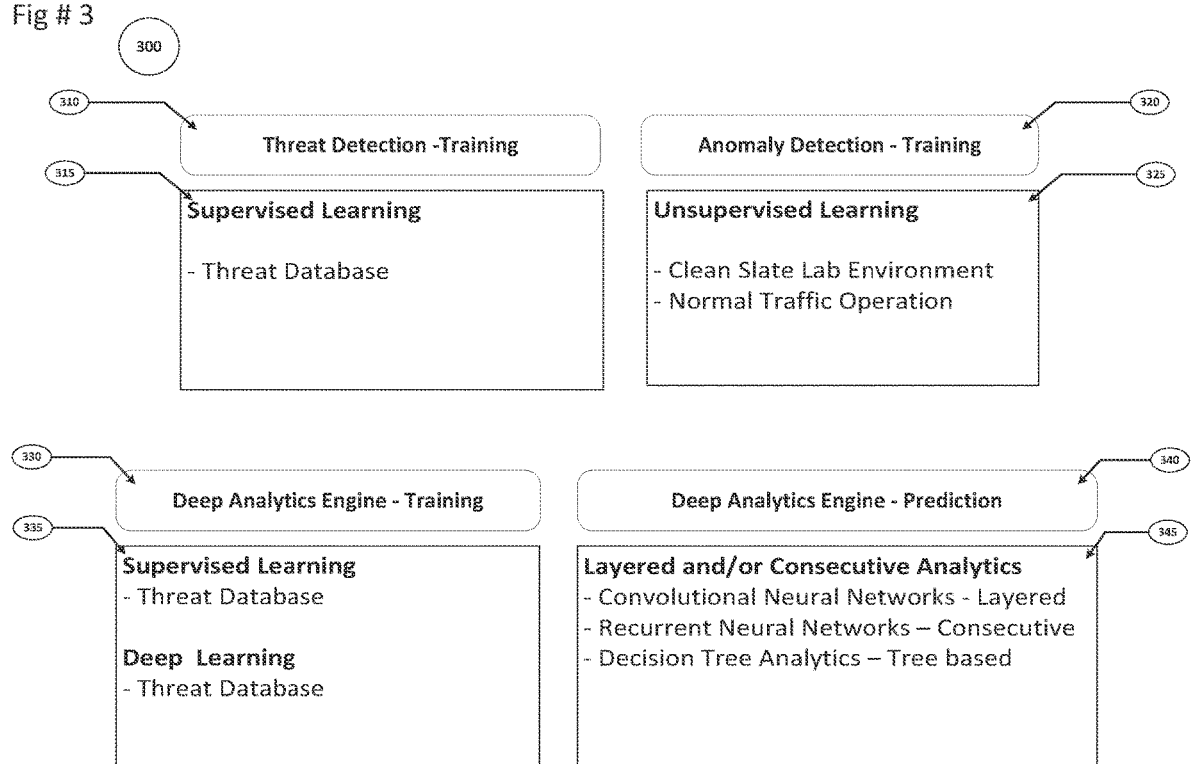

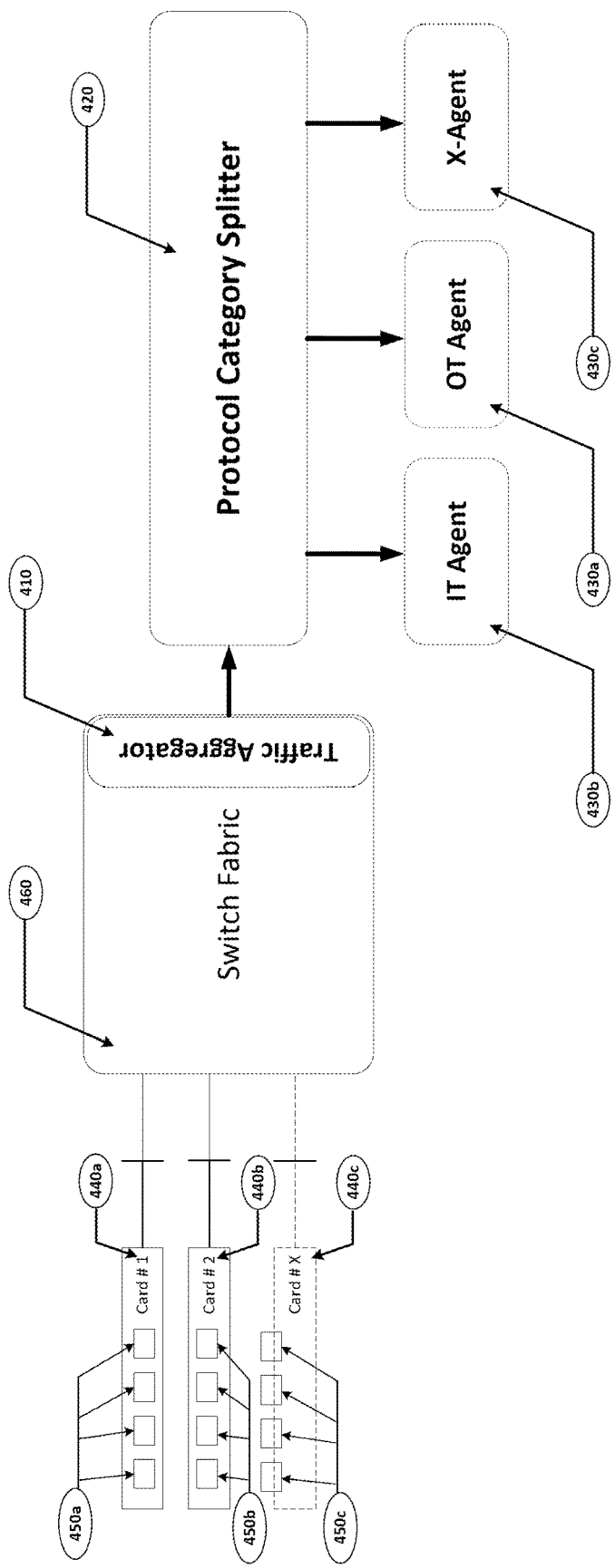
Fig # 4

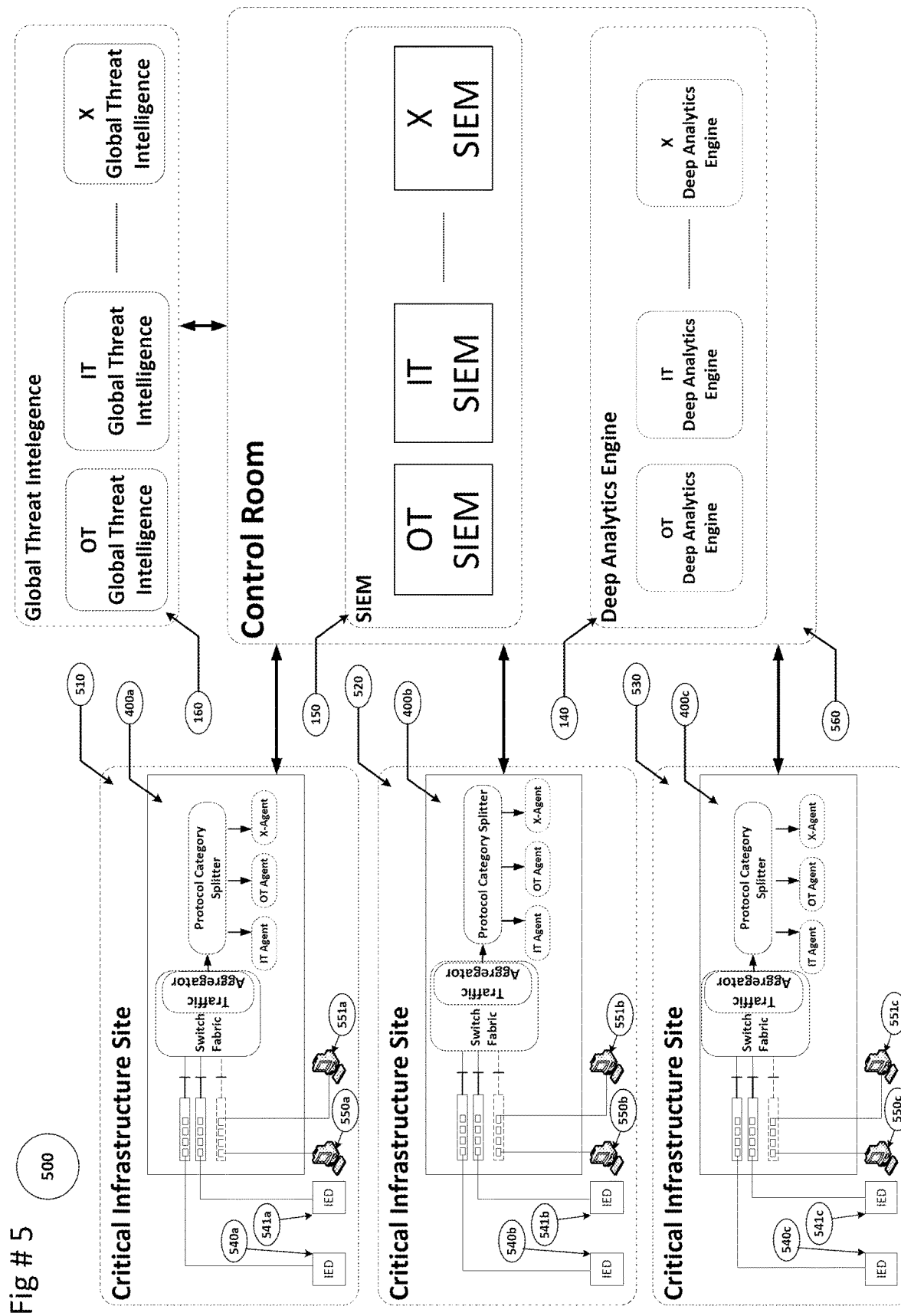

MACHINE LEARNING BASED INTRUSION DETECTION SYSTEM FOR MISSION CRITICAL SYSTEMS

FIELD OF INVENTION

The present invention is generally directed to the detection of an intrusion event in a computer network and a control network. More particularly, the present invention provides a system, framework, architecture, etc. for intrusion detection functions for network elements and control elements used in high demand and/or mission critical environments, including, but not limited to, power stations, sub-stations, intelligent transportation systems (ITS), rail, traffic control systems, chemical, oil & gas, critical manufacturing, and industrial applications.

BACKGROUND TO THE INVENTION

Communication between computers has become an important aspect of everyday life in both private and business environments. Networks provide a medium for this communication and further for communication between various types of elements connected to the network such as servers, personal computers, workstations, memory storage systems, or any other component capable of receiving or transmitting data to or from the network. The most popular open network is the global Internet, where literally millions of servers and computers are coupled through a Transport Control Protocol/Internet Protocol (TCP/IP) communication protocol. The elements communicate with each other using defined protocols that define the orderly transmission and receipt of information. Network communication protocols are formal standards and policies comprised of rules, procedures and formats that define communication between two or more devices over a network. Network protocols govern the end-to-end processes of timely, secure and managed data or network communication. It will be understood that various network protocols exist including, network communication protocols or basic data communication protocols, such as TCP/IP and HTTP, network security protocols that implement security over network communications, such as HTTPS, SSL and SFTP, and network management protocols that provide network governance and maintenance, such as SNMP and ICMP.

While a generally open network architecture permits a user on the network to have access to information on many different elements, it also provides access to messages generated by a user's computer, and to resources of the user's computer. Persons typically called "hackers" exploit open architectures to gain access to elements without authorization. Such hackers represent a significant security risk to any computer coupled to a network because a user for one computer may attempt to gain unauthorized access to resources on another networked computer. Such vulnerabilities are particularly problematic for the proper maintenance and operation of mission critical infrastructure.

In critical infrastructure (CI) applications and Industrial Control Systems (ICS), the system generally compromises computer network elements and control elements. The control elements are often referred to as IEDs (intelligent electronic devices). Examples of IEDs are PLC (programmable logic control) devices, relays, RTUs (Remote Terminal Unit) devices, HMI (Human Machine Interface) devices, etc.

While computer network process mostly information technology (IT) traffic including, but not limited to IT protocols and applications, control networks, often referred to as operational technology (OT) networks, carry various types of control traffic and signaling between IEDs, e.g. Modbus, DNP, GOOSE, IP2000, Mirrored bits, etc. In addition, network servers and computers interact with IEDs through supervisory control and data acquisition (SCADA) protocols.

In an effort to control access to network and infrastructure and limit unauthorized access (e.g. intrusions) to network resources, a number of technologies directed to intrusion detection techniques, systems, methods and devices have been developed. Firewalls, encryption, and security auditing tools are useful in this world of security. A firewall is a system that is placed between two networks that controls what traffic is allowed between those networks. A firewall is usually placed between an external network (e.g. the Internet) and an internal network (e.g. an internal intranet). It can be viewed as a point of policy enforcement through which you can decide what network traffic is and is not permitted to and from the organization. When deployed correctly (itself a difficult task in a complex business environment), a firewall is an efficient tool to prevent attacks on the critical systems and data. For example, a firewall can be used to control the transfer of data into or out of a network. An intrusion detection system can be used to provide an alert in the event that the firewall is breached (or an attempt is made to breach the firewall) by an unauthorized user of the computer network. However, such intrusion detection techniques, systems, methods and devices have been developed for infrastructure that is typically distinct from that used in the proper maintenance and operation of mission critical infrastructure. Examples of existing systems are Information Technology (IT) Intrusion Detection Systems (IDS) that are focused only on IT-related intrusion detection. In addition, there exists some preliminary IDS systems specializing in control networks protocols with limited and discrete capabilities.

As critical infrastructure (CI) applications and industrial control systems (ICS) applications combine the aspects of both Information Technology (IT) networks and Operational Technology (OT) Networks, there is a need, therefore, for intrusion detection techniques, systems, methods and devices that can be used in the proper maintenance and operation of mission critical infrastructure that combine both IT and OT detection capabilities.

An additional challenge often presented in control networks is the fact that most of the systems are air-gapped from the outside world providing either very limited or in most cases no connection at all to the Internet. Most existing conventional IDS systems are signature based requiring frequent updates to stay current with new and evolving threats and threat signatures, without which the system is left highly vulnerable and ineffective. In view of the air-gap limitation of control networks, traditional IDS systems would be deemed ineffective for the environment.

Yet another limitation is the fact that most traditional IDS systems perform the function in a centralized manner. In some cases, they are combined with the firewall at the network entry points. In some other cases detection agents are embedded in edge devices to report suspicious behavior to a centralized platform for analysis, yet most of the network equipment in-between have very limited ability to detect intrusions or report intrusions caused by end points that do not include an agent. In control networks, including an agent in end devices such as IEDs, may not be feasible due to limitations on processing power as well as the current existing large install base and proprietary OS/software of such devices, Yet another limitation often found in control networks is the infrequent IED software update cycle. The limitation is due to the criticality of the system and the complexity and length of test cycles of code to ensure interoperability between all components. In most cases a software update will often require going through a full test cycle. This limitation makes it very difficult to accommodate security updates for either the agent or the threat/signature database. This limitation mandates developing a solution that retrofits to the environment without the need for frequent updates/patches to end devices (e.g. network elements (e.g. computers, etc.) and control elements (e.g. IEDs, etc.)).

With all the limitations and challenges above comes the need for new technologies and techniques to address the limitations.

SUMMARY OF THE INVENTION

There remains a need for intrusion detection techniques, systems, methods and devices that can be used in the proper maintenance and operation of mission critical infrastructure.

An aspect of the present invention is directed to a system for intrusion detection for network and control elements used in a mission critical environment connected to a network, the system comprising: (a) a traffic aggregator module for mirroring and aggregating network traffic; (b) a protocol category splitter module for receiving the mirrored and aggregated network traffic from the traffic aggregator and for splitting the mirrored and aggregated network traffic into a first and second protocol category; (c) a first and second intrusion detection system (IDS) module for the first and second protocol categories, the first intrusion detection system module for analyzing the mirrored and aggregated network traffic from the first protocol category and for transmitting a first IDS associated data and the second intrusion detection system module for analyzing the mirrored and aggregated network traffic from the second protocol category and for transmitting a second IDS associated data; and (d) a first and second security information and event management (SIEM) module for each of the first and second protocol categories, the first SIEM module for processing the first IDS associated data to make a first protocol category alert available to a user and the second SIEM module for processing the second IDS associated data to make a second protocol category alert available to the user.

A further aspect of the invention is directed to the above noted system wherein the system further comprises a first and second global threat intelligence platform (GTI) for the first and second IDS modules, comprising: (a) the first GTI for receiving the first IDS associated data and further analyzing the first IDS associated data for transmitting a first GTI response data to the first IDS module, the first IDS module utilizing the first GTI response data in the analyzing of the mirrored and aggregated network traffic of the first protocol category by the first IDS module; and (b) the second GTI for receiving the second IDS associated data and further analyzing the second IDS associated data for transmitting a second GTI response data to the second IDS module, the second IDS module utilizing the second GTI response data in the analyzing of the mirrored and aggregated network traffic of the second protocol category by the second IDS module.

A further aspect of the invention is directed to the above noted system wherein the first and second IDS associated data each comprises alerts data and analytics data.

A further aspect of the invention is directed to the above noted system wherein the first and second SIEM module receive the first and second alerts data of the first and second IDS associated data.

A further aspect of the invention is directed to the above noted system wherein the first and second GTI module receive the first and second analytics data of the first and second IDS associated data.

Yet a further aspect of the invention is directed to the above noted system wherein the first and second IDS module further comprises a first and second IDS agent module for analyzing the first and second mirrored and aggregated network traffic from the first and second protocol categories and for transmitting a first and second IDS agent data.

Yet a further aspect of the invention is directed to the above noted system wherein the system further comprises a first and second deep analytics engine (DAE) module for receiving the first and second IDS agent data and for transmitting a first and second DAE data.

Yet a further aspect of the invention is directed to the above noted system wherein the first and second IDS agent further comprises a first and second packet analyzer for analyzing and normalizing the mirrored and aggregated network traffic of the first and second protocol categories and for transmitting a first and second packet analyzer data.

Yet a further aspect of the invention is directed to the above noted system wherein the first and second packet analyzer data is further comprised of a first and second potential threat data and a first and second potential anomaly data.

Yet a further aspect of the invention is directed to the above noted system wherein the first and second IDS agent further comprises a first and second threat detection module for the receiving and analyzing the first and second potential threat data, and for transmitting the first and second threat detection data.

Yet a further aspect of the invention is directed to the above noted system wherein the first and second IDS agent further comprises a first and second anomaly detection module for receiving and analyzing the first and second potential anomaly data, and for transmitting the first and second anomaly detection data.

Yet a further aspect of the invention is directed to the above noted system wherein the first and second anomaly detection data is transmitted to the first and second DAE modules for further analysis to produce the first and second DAE data.

Yet a further aspect of the invention is directed to the above noted system wherein the traffic aggregator module, the protocol category splitter module and at least one of the first and second IDS agents exist on an edge Ethernet switch where the network and control elements connect.

Yet a further aspect of the invention is directed to the above noted system wherein at least one of the first and second DAE modules exists as a centralized function at a control room level.

Yet a further aspect of the invention is directed to the above noted system wherein at least one of the first and second GTI modules exist as a centralized function.

Yet a further aspect of the invention is directed to the above noted system wherein the first and second protocol categories are configurable.

Yet a further aspect of the invention is directed to the above noted system wherein the first and second protocol categories are configurable based on the group consisting of traffic type, device type, protocol, device, network address, and TCP/UDP port.

Yet a further aspect of the invention is directed to the above noted system wherein the first and second protocol categories are configurable based on OT traffic and IT traffic.

Yet a further aspect of the invention is directed to the above noted system wherein the traffic aggregator module exists at the network edge for allowing access to a copy of all of the network traffic.

Yet a further aspect of the invention is directed to the above noted system wherein at least one of the first or second IDS modules communicates at least one of the first or second protocol category alert to at least one of the first or second SIEM modules and the at least one of the first or second SIEM module displays the at least one of the first or second protocol category alert to the user and facilities the user's interaction with the at least one of the first or second protocol category alert.

Yet a further aspect of the invention is directed to the above noted system wherein at least one of the first and second SIEM modules having an interface to facilitate a user configuring at least one of the traffic aggregator module, the protocol category splitter module and at least one of the first and second IDS modules.

Yet a further aspect of the invention is directed to the above noted system wherein the first and second packet analyzer modules analyze and normalize the mirrored and aggregated network traffic and based on the results thereof directs potential threats to at least one of the first and second threat detection modules and potential anomalies to at least one of the first and second anomaly detection modules.

Yet a further aspect of the invention is directed to the above noted system wherein at least one of the first and second threat detection modules receives at least one of the first and second packet analyzer data for performing analytics to confirm a first threat and where the first threat has been detected, the at least one of the first and second threat detection modules issues a first threat alert.

Yet a further aspect of the invention is directed to the above noted system wherein at least one of the first and second anomaly detection modules receives at least one of the first and second packet analyzer data for performing analytics to confirm an anomaly and where the anomaly has been detected, the at least one of the first and second anomaly detection modules issues an anomaly alert.

Yet a further aspect of the invention is directed to the above noted system wherein at least one of the first and second DAE modules receives at least one of the first and second IDS associated data for performing further analytics to confirm a second threat and where the second threat has been detected, the at least one of the first and second DAE modules issues a second threat alert.

Yet a further aspect of the invention is directed to the above noted system wherein at least one of the first and second IDS modules employs machine learning.

Yet a further aspect of the invention is directed to the above noted system wherein at least one of the first and second threat detection modules utilizes a supervised learning training technique using a labelled threat database data set.

Yet a further aspect of the invention is directed to the above noted system wherein at least one of the first and second anomaly detection modules utilizes an unsupervised learning training technique using a clean slate data set from a lab environment and/or normal traffic operation.

Yet a further aspect of the invention is directed to the above noted system wherein at least one of the first and second DAE modules during the training process utilizes (i) supervised learning techniques with a labeled threat data set; and/or (ii) deep neural networks can be utilized for feature extraction.

Yet a further aspect of the invention is directed to the above noted system wherein at least one of the first and second DAE modules during the prediction process utilizes: (i) convolutions neural networks for deep and layered analytics; (ii) recurrent neural networks for consecutive conclusive analytics; and/or (iii) decision trees based analytics.

Another aspect of the present invention is directed to a method for intrusion detection for network and control elements used in a mission critical environment connected to a network, the method comprising: (a) mirroring and aggregating network traffic from the network; (b) splitting the mirrored and aggregated network traffic from step (a) into a first and second protocol category network traffic; (c) analyzing the first protocol category network traffic from step (b) and transmitting a first IDS associated data and analyzing the second protocol category network traffic from step (b) and transmitting a second IDS associated data; and (d) processing the first and second IDS associated data from step (c) for each of the first and second protocol categories to determine whether to make a first or second protocol category alert available to a user.

A further aspect of the invention is directed to the above noted method wherein the method further comprises: (i) further analyzing the first IDS associated data from step (c) to produce a first GTI response data, the first GTI response data utilized in the analyzing of the mirrored and aggregated network traffic from step (b) to determine whether to make a first protocol category alert available to a user in step (d); and (ii) further analyzing the second IDS associated data from step (c) to produce a second GTI response data, the second GTI response data utilized in the analyzing of the mirrored and aggregated network traffic from step (b) to determine whether to make a second protocol category alert available to a user in step (d).

A further aspect of the invention is directed to the above noted method wherein the first and second IDS associated data each comprises alerts data and analytics data.

Yet a further aspect of the invention is directed to the above noted method wherein the analysis of step (d) receives the first and second alerts data of the first and second IDS data.

Yet a further aspect of the invention is directed to the above noted method wherein the analysis of steps (i) and (ii) receives the first and second analytics data of the first and second IDS data.

Yet a further aspect of the invention is directed to the above noted method wherein the analysis of step (c) further comprises analyzing the first and second mirrored and aggregated network traffic from the first and second protocol categories and transmitting a first and second IDS agent data.

Yet a further aspect of the invention is directed to the above noted method wherein the method further comprises receiving the first and second IDS agent data and transmitting a first and second DAE data.

Yet a further aspect of the invention is directed to the above noted method wherein the analysis of step (c) further comprises analyzing and normalizing the mirrored and aggregated network traffic of the first and second protocol categories of step (b) and transmitting a first and second packet analyzer data where a potential threat or potential anomaly has been detected.

Yet a further aspect of the invention is directed to the above noted method wherein the first and second packet analyzer data is further comprised of a first and second potential threat data upon detection of the potential threat and a first and second potential anomaly data upon detection of the potential threat.

Yet a further aspect of the invention is directed to the above noted method wherein the analysis of step (c) further comprises receiving and analyzing the first and second potential threat data, and transmitting the first and second threat detection data.

Yet a further aspect of the invention is directed to the above noted method wherein the analysis of step (c) further comprises receiving and analyzing the first and second packet potential anomaly data, and transmitting the first and second anomaly detection data.

Yet a further aspect of the invention is directed to the above noted method wherein the first and second anomaly detection data is further analyzed to produce a first and second DAE data.

Yet a further aspect of the invention is directed to the above noted method wherein the first and second protocol categories are configurable based on any of the group consisting of traffic type, device type, protocol, device, network address, and TCP/UDP port.

Yet a further aspect of the invention is directed to the above noted method wherein the first and second protocol categories are configurable based on OT traffic and IT traffic.

Yet a further aspect of the invention is directed to the above noted method wherein step (d) further comprises an interface to facilitate the user configuring at least one of the steps of the process and interacting with the first and second protocol category alerts.

Yet a further aspect of the invention is directed to the above noted method wherein step (c) receives at least one of the first or second anomaly detection data and performs further analytics to determine whether to transmit a first or second protocol category alert.

Yet a further aspect of the invention is directed to the above noted method wherein if the further analytics cannot determine whether to transmit a first or second protocol category alert, then step (c) further comprises analyzing at least one of the first or second DAE data to produce a GTI response data, the GTI response data utilized in further analyzing the least one of the first or second anomaly detection data to determine whether to transmit a first or second protocol category alert.

Yet a further aspect of the invention is directed to the above noted method wherein step (c) employs machine learning.

Yet a further aspect of the invention is directed to the above noted method wherein step (c) employs machine learning and utilizes a supervised learning training technique using a labelled threat database data set.

Yet a further aspect of the invention is directed to the above noted method wherein step (c) employs machine learning and utilizes an unsupervised learning training technique using a clean slate data set from a lab environment and/or normal traffic operation.

Yet a further aspect of the invention is directed to the above noted method wherein step (c) employs machine learning and during the training process utilizes (i) supervised learning techniques with a labeled threat data set; and/or (ii) deep neural networks can be utilized for feature extraction.

Yet a further aspect of the invention is directed to the above noted method wherein step (c) employs machine learning and during the prediction process utilizes: (i) convolutions neural networks for deep and layered analytics; (ii) recurrent neural networks for consecutive conclusive analytics; and/or (iii) decision trees based analytics.

Another aspect of the prevention invention is directed to a device for intrusion detection for network and control elements used in a mission critical environment connected to a network, the device comprising: (a) an Ethernet switch; (b) a traffic aggregator module connected to the Ethernet switch for mirroring and aggregating network traffic; (c) a protocol category splitter module connected to the traffic aggregator for receiving the mirrored and aggregated network traffic from the traffic aggregator and splitting the mirrored and aggregated network traffic into a first and second protocol category; and (d) a first and second intrusion detection system (IDS) module for the first and second protocol categories, the first intrusion detection system module for analyzing the mirrored and aggregated network traffic from the first protocol category and for transmitting a first IDS associated data and the second intrusion detection system module for analyzing the mirrored and aggregated network traffic from the second protocol category and for transmitting a second IDS associated data; wherein the first and second IDS associated data is processed to determine whether to make a first or second protocol category alert available to a user.

Yet a further aspect of the invention is directed to the above noted device wherein the first and second IDS associated data each comprises alerts data and analytics data.

Yet a further aspect of the invention is directed to the above noted device wherein the first and second IDS module further comprises a first and second IDS agent module for analyzing the first and second mirrored and aggregated network traffic from the first and second protocol categories and for transmitting a first and second IDS agent data.

Yet a further aspect of the invention is directed to the above noted device wherein the first and second IDS agent further comprises a first and second packet analyzer for analyzing and normalizing the mirrored and aggregated network traffic of the first and second protocol categories and for transmitting first and second packet analyzer data.

Yet a further aspect of the invention is directed to the above noted device wherein the first and second packet analyzer data is further comprised of a first and second potential threat data and a first and second potential anomaly data.

Yet a further aspect of the invention is directed to the above noted device wherein the first and second IDS agent further comprises a first and second threat detection module for the receiving and analyzing the first and second potential threat data, and for transmitting the first and second threat detection data.

Yet a further aspect of the invention is directed to the above noted device wherein the first and second IDS agent further comprises a first and second anomaly detection module for receiving and analyzing the first and second potential anomaly data, and for transmitting the first and second anomaly detection data.

Yet a further aspect of the invention is directed to the above noted device wherein the device further comprises a first and second deep analytics engine (DAE) module for receiving the first and second IDS anomaly detection data and for further analyzing the first and second IDS anomaly detection data and transmitting a first and second DAE data.

Yet a further aspect of the invention is directed to the above noted device wherein the first and second protocol categories are configurable based on the group consisting of traffic type, device type, protocol, device, network address, and TCP/UDP port.

Yet a further aspect of the invention is directed to the above noted device wherein the first and second protocol categories are configurable based on OT traffic and IT traffic.

Yet a further aspect of the invention is directed to the above noted device wherein the first and second packet analyzer modules for analyzing and normalizing the mirrored and aggregated network traffic and based on the results of the analysis directs potential threats to at least one of the first and second threat detection modules and potential anomalies to at least one of the first and second anomaly detection modules.

Yet a further aspect of the invention is directed to the above noted device wherein at least one of the first and second threat detection modules receives at least one of the first and second potential threat data for performing analytics to confirm a first threat and where the first threat has been detected, the at least one of the first and second threat detection modules issues a first threat alert.

Yet a further aspect of the invention is directed to the above noted device wherein at least one of the first and second anomaly detection modules receives at least one of the first and second potential anomaly data for performing analytics to confirm an anomaly and where the anomaly has been detected, the at least one of the first and second anomaly detection modules issues an anomaly alert.

Yet a further aspect of the invention is directed to the above noted device wherein at least one of the first and second DAE modules receives at least one of the first and second IDS agent associated data for performing further analytics to confirm a threat and where the threat has been detected, the at least one of the first and second DAE modules issues a threat alert.

Yet a further aspect of the invention is directed to the above noted device wherein at least one of the first and second IDS modules employs machine learning.

Yet a further aspect of the invention is directed to the above noted device wherein at least one of the first and second threat detection modules utilizes a supervised learning training technique using a labelled threat database data set.

Yet a further aspect of the invention is directed to the above noted device wherein at least one of the first and second anomaly detection modules utilizes an unsupervised learning training technique using a clean slate data set from a lab environment and/or normal traffic operation.

Yet a further aspect of the invention is directed to the above noted device wherein at least one of the first and second DAE modules during the training process utilizes (i) supervised learning techniques with a labeled threat data set; and/or (ii) deep neural networks can be utilized for feature extraction.

Yet a further aspect of the invention is directed to the above noted device wherein at least one of the first and second DAE modules during the prediction process utilizes: (i) convolutions neural networks for deep and layered analytics; (ii) recurrent neural networks for consecutive conclusive analytics; and/or (iii) decision trees based analytics.

Yet a further aspect of the invention is directed to the above noted device wherein the Ethernet switch further comprises an Ethernet line card connected to a switch fabric.

Yet a further aspect of the invention is directed to the above noted device wherein the switch fabric comprises a switch backplane.

Yet a further aspect of the invention is directed to the above noted device wherein the traffic aggregator is connected to the switch backplane, is configurable to selectively mirrors traffic of at least one port in both the ingress and egress directions, and has no impact on traffic between end devices.

BRIEF DESCRIPTION OF THE DRAWINGS

In the drawings, which illustrate embodiments of the invention:

FIG. 1 illustrates a preferred embodiment of the present invention detailing the overall system architecture and its components.

FIG. 2 illustrates a preferred embodiment of the present invention detailing the intrusion detection process flow.

FIG. 3 illustrates a preferred embodiment of the present invention detailing, at a high level, the Machine Learning Agent Training and Production Concepts.

FIG. 4 illustrates a preferred embodiment of the present device invention detailing the device implementation combining the traffic aggregation, protocol category splitter and the IDS-Agent functions.

FIG. 5 illustrates a preferred embodiment of the use of the present invention in an environment with multiple critical infrastructure sites and one or more control room.

DESCRIPTION OF THE PREFERRED EMBODIMENTS

The description that follows, and the embodiments described therein, is provided by way of illustration of an example, or examples, of particular embodiments of the principles and aspects of the present invention. These examples are provided for the purposes of explanation, and not of limitation, of those principles and of the invention.

It should also be appreciated that the present invention can be implemented in numerous ways, including as a process, method, an apparatus, a system, a device or a method. In this specification, these implementations, or any other form that the invention may take, may be referred to as processes. In general, the order of the steps of the disclosed processes may be altered within the scope of the invention. The description that follows, and the embodiments described therein, is provided by way of illustration of an example, or examples, of particular embodiments of the principles and aspects of the present invention. These examples are provided for the purposes of explanation, and not of limitation, of those principles and of the invention.

It will be understood by a person skilled in the relevant art that in different geographical regions and jurisdictions these terms and definitions used herein may be given different names, but relate to the same respective systems.

Although the present specification describes components and functions implemented in the embodiments with reference to standards and protocols known to a person skilled in the art, the present disclosure as well as the embodiments of the present invention are not limited to any specific standard or protocol. Each of the standards for Internet and other forms of computer network transmission (e.g., TCP/IP, UDP/IP, HTML, HTTP, SSL and SFTP) represent examples of the state of the art. Such standards are periodically superseded by faster or more efficient equivalents having essentially the same functions. Accordingly, replacement standards and protocols having the same functions are considered equivalents.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol.

A person skilled in the art will understand "mission critical" to refer systems or components, equipment, personnel, processes, procedures, software, etc. associated therewith that are essential to operation. Failure or disruption of such mission critical systems or elements thereof will result in serious impact on operations. Mission critical systems are the systems that essential to the business and operational safety. These are resilient systems with high degree of availability and performance matching stringent performance requirement. A person skilled in the art would understand that these are set out in various industrial standards, including, for example, IEC standards 61850-3 etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. may be here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

The present invention relates to electronic equipment (e.g. data transfer devices) and methods of using the same. More particularly, the present invention is directed to critical infrastructure intrusion detection and treat intelligence framework for network use in high demand or mission critical environments.

As used herein, an intrusion detection system ("IDS") will be understood to refer to a device, system, method, apparatus or software application that monitors one or more networks or systems for malicious activity, policy violations, or anomalous activity (e.g. all outside intrusion). Any malicious activity, violation or anomaly is typically reported either to an administrator or collected centrally using a security information and event management ("SIEM") system. A SIEM system combines outputs from multiple sources, and uses alarm/alert filtering techniques to distinguish malicious activity from false alarms.

A person skilled in the relevant art would understand the term "agent" to refer to a software and/or component of an IDS having the function of gathering system and/or network data, monitoring system and/or network activity, and issuing notifications upon detection of a threat and/or anomaly.

A person skilled in the relevant art would understand the term "alert", "alarm" or "notification" to refer to a message sent by an agent warning of a suspected or actual intrusion, malicious activity, violation or other anomaly and calling for some sort of action in response. Typically, such alerts, alarms and/or notifications may be sent to a display window in or on a management component and logged as an entry to a log file.

A person skilled in the art will understand that the present description will reference terminology from the field of artificial intelligence, including machine learning, and may be known to such a person skilled in the relevant art. A person skilled in the relevant art will also understand that artificial neural networks generally refer to computing or computer systems that are design to mimic biological neural networks (e.g. animal brains). Such systems "learn" to perform tasks by considering examples, generally without being programmed with any task-specific rules. For example, in image recognition, they might learn to identify images that contain cats by analyzing example images that have been manually labeled as "cat" or "no cat" and using the results to identify cats in other images. A person skilled in the relevant art will understand that a convolutional neural network is a class of neural networks that specializes in processing data that has a grid-like topology, such as an image. A digital image is a binary representation of visual data. It contains a series of pixels arranged in a grid-like fashion that contains pixel values to denote how bright and what color each pixel should be. A recurrent neural network (RNN) will be understood to refer to artificial neural networks where connections between nodes form a directed graph along a temporal sequence.

Machine learning techniques will generally be understood, within the context of intrusion detection and malware identification, as being used to identify and classify specific reviewed data. Machine learning approaches first tend to involve what is known in the art as a training phase. In the context of classifying functions, a training "corpus" is first constructed. This corpus typically comprises a set of known applications. Each application in this set is optionally accompanied with a "label" of it disposition, for example "benign", "malign", or "unknown". It is preferable to have fewer unknown samples. Furthermore, it is preferable for the corpus to be representative of the real world scenarios in which the machine learning techniques will ultimately be applied. For example, in the context of classifying software applications, it might be desirable if the applications in the corpus are reflective of what might be found on a typical system. This is followed by a "training phase" in which the applications together with the labels associated with the data, files, etc. themselves, are fed into an algorithm that implements the "training phase". The goal of this phase is to automatically derive a "model". A model effectively encodes a mathematical function whose input is the application and whose output is a classification. In the context of using machine learning to detect malware, the output of the model (when applied to a file whose disposition is being sought) might be a binary label of either "benign" or "malign". Certain machine learning models are also capable of producing a score that reflects the confidence in the label. For example, the output might be ("malign", 0.95) which can be taken to mean that the model believes that the feature vector has a 95% chance of corresponding to a malicious software application. A machine learning algorithm should ideally produce a classifier that is reasonably consistent with the training examples and that has a reasonable likelihood of generalizing to new instances. Generalization is preferred since it is expected that in practice the model will be evaluated on instances whose dispositions are not already known. Specific machine learning algorithms in the art include the Naive Bayes Algorithm, Artificial Neural Networks, Decision Trees, Support Vector Machines, Logistic Regression, Nearest Neighbors, etc. The term classifier is also used to describe a model. For example, one may refer to a Support Vector Machine classifier. Once the model/classifier is established, it can be used to evaluate new instances of software that are presented to a computer or computer network in practice.

A person skilled in the relevant art will understand that supervised learning refers to machine learning in which the classification of the observed data is inferred from a sample of the data supplied by an outside source. This is in contrast to unsupervised learning where there is only input data (X) and no corresponding output variables. A goal for unsupervised learning may be to model the underlying structure or distribution in the data in order to learn more about the data.

A person skilled in the relevant art will understand that the term "deep learning" refers to a type of machine learning based on artificial neural networks. Deep learning is a class of machine learning algorithms (e.g. a set of instructions, typically to solve a class of problems or perform a computation) that use multiple layers to progressively extract higher level features from raw input. For example, in image processing, lower layers may identify edges, while higher layers may identify human-meaningful items such as digits or letters or faces.

As used herein the term information technology IDS ("IT-IDS") refers to sub-systems, sub-architectures, etc. that perform intrusion detection for enterprise information technology protocols and applications (e.g. the storage, movement and protection of enterprise data). As used herein, the term operational technology IDS ("OT-IDS") refers to sub-systems, sub-architectures, etc. that work with intrusion detection for supervisory and/or control network protocols found in critical infrastructure applications, critical manufacturing, industrial applications and other mission critical technology.

Embedded Ethernet MACs and switches are utilized to provide Ethernet network connectivity to a host processor. The host processor may typically perform any number of functions such as, for example: device functions such as capturing sensor data from various sensors such as temperature sensor, accelerometer sensors, and position sensors; actuator functions such as controlling synchro motors, linear actuators, solenoids and valves; hybrid functions such as combination sensor and actuator functions; human-machine interface functions; data recorder functions; and gateway functions such as connecting multiple sensors and actuators via another communication means. Host functions may also include controller functions to control various devices and sensors; supervisory functions used for setup and maintenance of other elements on the network; and standalone subsystem functions.

A person skilled in the art will understand that the operation of the network ready device (e.g. mobile device, work station, etc.) may be controlled by a variety of different program modules. Examples of program modules are routines, programs, objects, components, data structures, etc. that perform particular tasks or implement particular abstract data types. It will be understood that the present invention may also be practiced with other computer system configurations, including multiprocessor systems, microprocessor-based or programmable consumer electronics, network PCS, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices. One skilled in the relevant art would appreciate that the device connections mentioned herein are for illustration purposes only and that any number of possible configurations and selection of peripheral devices could be coupled to the computer system.

Embodiments of the present invention can be implemented by a software program for processing data through a computer system. It will be understood by a person skilled in the relevant art that the computer system can be a personal computer, mobile device, notebook computer, server computer, mainframe, networked computer (e.g., router), workstation, and the like. The program or its corresponding hardware implementation is operable for providing user authentication. In one embodiment, the computer system includes a processor coupled to a bus and memory storage coupled to the bus. The memory storage can be volatile or non-volatile (i.e. transitory or non-transitory) and can include removable storage media. The computer can also include a display, provision for data input and output, etc. as will be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "providing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

The current invention is directed to systems, frameworks, architectures, etc. for implementing machine learning based IDS systems for critical infrastructure systems that provide for one or more of the following: (a) combining the IT-IDS and OT-IDS aspects; (b) overcoming the limitations presented by air-gapped systems through utilizing embodiments that are more suitable for control networks environments; (c) overcoming the infrequent IED software update cycle and the inability to provide security patches and signature updates at the IED level; (d) operating at the "network edge" so as to monitor the desired amount of network traffic (e.g. all or substantially all of the network traffic) and not just network traffic at connection or entry points; (e) not requiring an agent on any IEDs; and (f) utilizing machine learning technologies to embody some of the desired functions.

An aspect of the present invention is a system comprising a traffic aggregator (TA) component(s), a protocol category splitter (PCS) component(s), an IT-IDS component(s), an OT-IDS component(s), an IT-SIEM(s), an OT-SIEM(s), a Deep Analytics Engine (DAE) component(s) and a Global Threat Intelligence (GTI) platform(s).

Another aspect of the present invention is the ability to monitor all network traffic facilitated through the introduction of a traffic aggregator (TA) module or function at the "network edge", preferably at the point of IED connection to network switch (e.g. Ethernet edge switch) which may allow access to a copy of any or all of the network traffic through mirroring. This includes but not limited to, traffic between IEDs across sites, within the same site, and/or even within the same Ethernet switch. A person skilled in the art would understand that the "network edge" references to that part of the network where end devices (e.g. network elements (e.g. computers, etc.) and control elements (e.g. IEDs, etc.)) connect (e.g. an edge port) and/or, within the network hierarchy, can be more directed towards the edge of the network (e.g. not in the core or distribution layer of the network).

In a preferred embodiment, the traffic aggregator module or function would exist on network edge switches. This aggregator function may mirror traffic across one or more, or, if desired, all edge ports and may direct the mirrored traffic to an internal and/or external port(s) to be connected to the protocol category splitter.

Another aspect of this invention is a protocol category splitter (PCS) module or function which may classify traffic based on protocol categories, the categories preferably being configurable. In a preferred embodiment, it will be understood that the number, criteria, characteristics, nature, etc. of the protocol categories may be configurable and, more preferably, each category may be based on any of the following, alone or in combination: traffic type, device type, protocol, device, network address, (e.g. MAC Addresses, IP Address, etc.), TCP/UDP port, etc. In a preferred embodiment, protocol categories based on traffic type can be OT traffic and IT traffic, although in some cases more categories can be also introduced.

In a preferred embodiment, there may be one IDS system per at least one protocol category.

In a further preferred embodiment, there may be provided one IDS system per one protocol category. An example would be an IT IDS for IT protocol category, an OT IDS for OT Protocol Category, etc.

Yet another aspect of the present invention is an IT-IDS component further comprising of an IT packet analyzer module, an IT threat detection module and an IT anomaly detection module. The combination of all three may be referred to as an IT Agent. In a preferred embodiment, the IT agent may be placed on the network edge switch (e.g. an Ethernet switch present at the network edge).

Yet another aspect of this present invention is that the IT packet analyzer module ingests the IT traffic received and performs basic analytics and normalization tasks. The IT threat detection module identifies threats based on previous knowledge of known threat vectors and/or threat patterns while the IT anomaly detection module identifies what does not seem as normal traffic yet could not be identified as a known threat.

Yet another aspect of the present invention is an OT-IDS component comprising of an OT packet analyzer module, an OT threat detection module and an OT anomaly detection module. The combination of all three may be referred to as an OT Agent. In a preferred embodiment, the OT agent may be placed on the network edge switch (e.g. an Ethernet switch present at the network edge).

Yet another aspect of this present invention is that the OT packet analyzer module ingests the OT traffic received and performs basic analytics and normalization tasks. The OT threat detection module identifies threats based on previous knowledge of known threat vectors and/or threat patterns while the OT anomaly detection module identifies what does not seem as normal traffic yet could not be identified as a known threat.

Yet another aspect of this present invention is that in a preferred embodiment there can be one or more other IDS Agent(s) for each other Protocol Category identified, i.e. X-IDS and X-Agent for X-Protocol Category (see, for example, FIG. 1).

In yet another aspect of this present invention, there may exist a deep analytics engine module (DAE) for one or more IDS agents associated with one or more protocol categories. The function of the DAE module is to investigate any anomaly detected by the applicable anomaly detection module and further analyze such anomaly to identify whether: (a) the anomaly is not a threat; (b) the anomaly is identified as a recognized threat; or (c) the anomaly is a possible threat yet could not be recognized. In the case of (b), the threat is reported to an applicable SIEM (e.g. SIEM within the Protocol Category) and may also be reported to an applicable Global Threat Intelligence platform (e.g. GTI within the applicable protocol category). In the case of (c), the potential threat could be escalated to the appropriate protocol category Global Threat Intelligence platform for further analysis. Based on the analysis by the protocol category GTI, if the anomaly is determined to be a threat, the GTI may further advise the DAE module that such anomaly should be classified as a threat, which would be then reported to the applicable SIEM and may be used by DAE to enhance its detection analytics.

In yet another aspect of this current invention in a preferred embodiment, the Deep Analytics Engine module may perform its own analytics, and while performing its own analytics may rely on automated analytics or manual human analysis.

In yet another aspect of this current invention, in a preferred embodiment, for each Protocol Category there may exist one or more SIEMs optimized for the types of alerts and anomalies specific to that Protocol Category. In a preferred embodiment, the SIEM may comprise (a) a user authentication database; (b) a database to store appropriate and applicable Protocol Category alerts, events, incidents, log files, etc.; and (c) a user interface displaying alerts, events, incidents, log files, etc. so as to allow users to interact with the IDS system and configure its components.

Another aspect of this current invention, in a preferred embodiment, due to the air-gapped and infrequent updates limitation, IDS systems used in control networks may require the use of a technology that: (a) can provide effective security without the need for frequent updates; (b) can provide effective security without the need for signature updates; (c) does not require any modification of the IED hardware or software (e.g. no agent needs to be installed on the IED); and (d) can inspect potentially all network traffic as deemed required by the application (e.g. traffic between IEDs, across sites, within the same site and/or even within the same Ethernet switch) as opposed to inspecting traffic at the entry point (e.g. in some cases, the IDS system is combined with the Firewall) and/or at site boundaries (e.g. interconnection points between sites within the same network).

To address the above points, in a preferred embodiment, the IDS systems may: (a) include an Agent that exists in network equipment (in a preferred embodiment Ethernet edge switches); and (b) utilize a technology that does not relay on signatures and frequent updates.

In yet another aspect of this current invention, in a preferred embodiment, machine learning (ML) can be used as the technology of choice at the Agent Level (e.g. OT/IT agent at the edge Ethernet switch) and/or at the Deep Analytics Engine level. A Machine learning trained Agent can perform the packet analyzer, threat detection and/or anomaly detection functions and successfully categorize, classify and/or identify threats and/or anomalies (e.g. previously known threats, threat patterns, new unknown threats and anomalies). Deep Analytics Engines using machine learning techniques may provide further and more complex analytics on a centralized platform, including but not limited to, existing at the Control Room (e.g. OT CR) level or Security Operations Center (e.g. IT SOC) level.

Yet another aspect of this current invention, in a preferred embodiment, the machine learning technology used at the agent level and applied to the packet analyzer module and the threat detection module may utilize a supervised learning training technique using a labelled threat database data set.

Yet another aspect of this current invention, in a preferred embodiment, the machine learning technology used at the agent level and applied to the anomaly detection module can utilize an unsupervised learning training technique using a clean slate data set from a lab environment and/or normal traffic operation.

Yet another aspect of this current invention, the machine learning technology may be used at the deep analytics engine level during the training process wherein the training process may utilize (i) supervised learning techniques with a labeled threat data set; and/or (ii) deep learning techniques utilizing neural networks may be used for feature extraction and learning.

Yet another aspect of this current invention, in a preferred embodiment, the machine learning technology used at the deep analytics engine level during the prediction process, i.e. identifying threats during operation, may utilize besides classic machine learning: (i) convolutions neural networks for deep and layered analytics; (ii) recurrent neural networks for consecutive conclusive analytics; and/or (iii) decision trees based analytics.

Yet another aspect of the present invention comprises preferred embodiment of the overall system implementation in a multi infrastructure sites environment where the sites are connected to one or more control room. In a preferred embodiment, Ethernet edge switches at preferably each site may integrate: (a) Traffic Aggregator function, (b) Protocol Category Splitter function, and (c) Agent functions. In a further preferred embodiment, the Deep Analytic Engine(s) function and the SIEM(s) function may be centralized at the control room level while the Global Threat Intelligent Platform(s) functions may be kept local at the control room level, regional, national, global per industry or global levels (see, for example, FIG. 5).

Yet another aspect of the present invention is the expected flow of data analytics through the system referred to as the Intrusion Detection Process Flow (IDPF). In a preferred embodiment, traffic transmitted and received on all network edge ports connected to end devices, i.e. computers, servers, LED's HMI etc. may be mirrored and aggregated through a Traffic Aggregator module. The aggregated mirrored traffic may be then funneled through a Protocol Category Splitter (PCS). The output of the PCS may be directed to the respective Agent based on the Protocol Category, i.e. OT Protocol Category may be directed to OT Agent, etc.

Yet another aspect of this present invention, in a preferred embodiment, the process flow within the IDS Agent of the applicable protocol category may start with Ethernet packets arriving from the protocol category splitter to be analyzed and normalized by at least one packet analyzer of the applicable protocol category and based on the analysis results, the Ethernet packets can be either ignored (e.g. not considered a potential threat or anomaly) or passed along, for further analysis, to either the threat detection module (e.g. considered a potential threat) or the anomaly detection module (e.g. considered a potential anomaly), within the applicable protocol category(s).

Yet another aspect of this present invention, in a preferred embodiment, the output of the threat detection module of the applicable protocol category(s) would be either ignored if no threat is detected (e.g. not triggering an alert). If one or more threats are detected, one or more specific alert(s) based on the detected threat(s) may be generated. In a preferred embodiment, the alert(s) generated may be reported to the respective SIEM Yet another aspect of the current invention, in a preferred embodiment there exists one or more SIEM for each one or more protocol category.

Yet another aspect of this present invention, in a preferred embodiment, the threat detection module and the SIEM may have a two-way connection to facilitate: (i) reporting of alerts detected by the threat detection module to the SIEM; and/or (ii) allowing the system User to interact with (e.g. reviewing, commenting, responding, instructing, etc.) the threat detection module through an interface (e.g. the SIEM User Interface); and/or (iii) allowing the system user to make configuration changes to the threat detection module through an interface.

Yet another aspect of this present invention, in a preferred embodiment, traffic (e.g. Ethernet packets) passed to the anomaly detection module are inspected for anomalies and in a preferred embodiment anomalies detected may be directed to the deep analytics engine module and/or may be reported to the applicable SIEM.

Yet another aspect of this invention in a preferred embodiment is the deep analytics engine module may perform further analysis to identify if detected anomalies can be confirmed as threats and reported as alerts to the applicable SIEM. The connection between the DAE and the applicable SIEM(s) is a two way connection for: (i) reporting of alerts detected to the appropriate SIEM(s); (ii) allowing the system user to interact with (e.g. reviewing, commenting, responding, instructing, etc.) the module(s) through an interface (e.g. the SIEM User Interface); and/or (iii) allowing the system user to make configuration changes to the module(s) through an interface.

In another embodiment, the deep analytics engine module may interact with an applicable global threat intelligence platform to: (a) perform more advanced analytics that cannot be performed locally; (b) when a threat is confirmed, share results of the analytics performed locally with the Global Threat Intelligence platform for global threat database updates and intelligence sharing; (c) the DAE may receive updated threat database information from the GTI; and/or; (d) DAE may query the GTI for specific threat related information. The updates in (c) and queries in (d) may be used by the DAE to further train and enhance its local analytics.

Yet another aspect of this current invention is, in a preferred embodiment, one or more global threat intelligence platform(s), based, for example, on protocol category, industry, geographical region, etc., may exist. A person skilled in the relevant art would understand that Global Threat Intelligence platforms may be based on entity level, industry wide level, regional level, national level or global level or any combination of the options based on the system requirement, the industry and the limitations.

Another aspect of this present invention is a device. In a preferred embodiment the device may be comprised of one or more of the following functions: (a) an Ethernet switch; (b) a traffic aggregator(s); (c) a protocol category splitter(s); and (d) an IDS Agent(s). In an alternative embodiment, the device may also include a deep analytics engine(s).

Yet another aspect of this present invention, in a preferred embodiment the device may have one or more Ethernet line card connected to one or more switch fabrics comprising a switch backplane.

Another aspect of the present invention, in a preferred embodiment, as part of the device, is one or more traffic aggregator connected to the switch backplane. The traffic aggregator function may be configurable and may selectively mirror traffic of selected ports in both the ingress and egress directions. The traffic aggregator(s) may have no impact on traffic between devices, it may only create an independent copy of traffic.

Another aspect of the present invention, in a preferred embodiment, as part of the device there exists one or more protocol category splitter. The protocol category splitter(s) may receive mirrored traffic from the traffic aggregator(s) and perform a protocol category splitter function. The output of the protocol category splitter(s) may be directed to the respective or applicable IDS agent(s).

Another aspect of the present invention, in a preferred embodiment, as part of the device and within each agent there may exist one or more packet analyzer module.

Another aspect of the present invention, in a preferred embodiment, as part of the device and within each agent there may exist one or more threat detection and anomaly detection modules.

Another aspect of the present invention, in a preferred embodiment, within the device each agent may have a two-way communication to one or more applicable SIEM(s). The two-way connection may facilitate both the threat detection module and an anomaly detection module: (i) reporting of alerts detected to the appropriate SIEM(s); (ii) allowing the system user to interact with (e.g. reviewing, commenting, responding, instructing, etc.) the modules through an interface (e.g. the SIEM User Interface); and/or (iii) allowing the system user to make configuration changes to the modules through an interface.

In an alternative embodiment, the device of the present invention may also include one or more deep analytics engine function per agent. The deep analytics engine(s) may receive anomalies detected by the anomaly detection function within the respective agent, perform further analytics and report any identified alerts to the respective SIEM. The connection between the DAE and the applicable SIEM(s) is a two way connection for: (i) reporting of alerts detected to the appropriate SIEM(s); (ii) allowing the system user to interact with (e.g. reviewing, commenting, responding, instructing, etc.) the modules through an interface (e.g. the SIEM User Interface); and/or (iii) allowing the system user to make configuration changes to the modules through an interface.

In alternative embodiment, the deep analytics engine module may interact with an applicable global threat intelligence platform to: (a) perform more advanced analytics that cannot be performed locally; (b) when a threat is confirmed, may share results of the analytics performed locally with the global threat intelligence platform for global threat database updates and intelligence sharing; (c) the DAE may receive updated threat database information from the GTI; and/or; (d) DAE query the GTI for specific threat related information. The updates in (c) and queries in (d) may be used by the DAE to further train and enhance its local analytics.

FIG. 1 is an illustration of the IDS system, framework or architecture of the present invention 100, its applicable components and how in a preferred embodiment they can be interconnected. In a preferred embodiment, there is provided Traffic Aggregator 110 connects to one or more Protocol Category Splitter 120*a*, 120*b*. The number of Protocol Categories may be determined by the number of applicable Protocol Category Splitters 120. As would be understood, there can be any number of Protocol Category Splitters (120*c*, 120*d*, 120*e*, etc., not shown). Each Protocol Category Splitter 120 connects to one or more IDS 130*a*, 130*b*, 130*c*, etc. In a preferred embodiment, one of the IDSs can be OT-IDS 130*a*, another can be IT-IDS 130*b*. FIG. 1 also shows an example X-IDS 130*c*, which comprises example X-Agent 135*c*, and X-DAE 140*c*. A person skilled in the art will also understand that there may be any number of IDSs based on any number of Protocol Categories and that the components of the X-IDS may be the same as the components for the IDS described herein. In a preferred embodiment, the IDS 130*a*, 130*b* may further comprises an Agent 135*a*, 135*b* and, in a further preferred embodiment, a Deep Analytics Engine 140*a*, 140*b*. In a preferred embodiment, the Agent 135*a*, 135*b* further comprise a Packet Analyzer 145*a*, 145*b*, Threat Detection 146*a*, 146*b*, and Anomaly Detection 147*a*, 147*b*.

In a preferred embodiment, as illustrated in FIG. 1 each IDS 130 connects to one or more SIEM 150 specific for each Protocol Category. As shown in FIG. 1, OT-IDS 130*a* would connect to OT-SIEM 150*a*; IT-IDS 130*b* would connect to IT-SIEM 150*b*, etc. The connection of IDS 130 to the SIEM 150 can be for Alerts and Anomaly reporting and user interaction.

As illustrated in FIG. 1, IDS 130 may connect to Global Threat Intelligence platform 160 for each Protocol Category. For example, OT-IDS 130*a* would in a preferred embodiment, connect to OT Global Threat Intelligence platform 160*a*. It will also be understood that there may be a GTI platform for each Protocol Category, including but not limited to, for example, X-GTI 160*c* (not shown).

FIG. 2 illustrates a further aspect of the invention, namely the intrusion detection process flow, process or method 200. In a preferred embodiment, Traffic Aggregator 110 receives traffic from all network ports, aggregates the traffic and pass it along to the Protocol Category Splitter 120 which in turn separates traffic based on the user configured Protocol Categories and direct each Protocol Category to the corresponding Agent 130 for that particular category. For example, where the system 100 has been configured to have an OT Protocol Category, Protocol Category Splitter 120*a* shall directed the identified OT protocol category traffic to OT Agent 130*a*.

As shown in FIG. 2, there is provided the process flow within IDS Agent 135, wherein the Ethernet packets arriving from Protocol Category Splitter 120 first get analyzed by Packet Analyzer 145 and based on the analysis result, ignored or passed along to the Threat Detection module 146 or Anomaly Detection Module 147 for further analysis (as noted above).

FIG. 2 further illustrates the interaction between Threat Detection module 146 and SIEM 150. The connection of 146 to 150 may provide the user with Alerts, updates upon detection of threats or potential threats, may further allow the user to interact with the threat detection module 146, etc. including, as noted herein, for example, to configure the threat detection module.

FIG. 2 further illustrates the connection between the Anomaly Detection module 147 and the Deep Analytics Engine 140. Anomalies detected by 147 are passed on to the Deep Analytic Engine 140 for further analysis.

FIG. 2 also shows the connection between the Deep Analytics Engine 140 and The Global Threat Intelligence platform 160. This connection between 140 and 160 may allow 140 to report new identified threats to the Global Threat Intelligence platform 160 and to utilize the platform consolidated threat knowledge for further analysis as noted herein.

FIG. 2 further illustrates in a preferred embodiment a connection between the Deep Analytics Engine 140 and SIEM 150 may exist to allow for Alerts reporting and user interaction with the system as noted herein.

FIG. 2 further illustrates in a preferred embodiment a connection between the Traffic Aggregator 110 and the SIEM 150 for reporting and user configuration as described here within.

FIG. 2 further illustrates in a preferred embodiment a connection between the Protocol Category Splitter 120 and the SIEM 150 for reporting and user configuration as described here within.

FIG. 3 illustrates a preferred methodology 300 of training the Machine Learning aspects or components of the system, architecture, etc. of the present invention, including, but not limited to, the Threat Detection module 146, Anomaly Detection module 147 and/or the DAE 140. In a preferred embodiment, as shown at 310, the ML training of the Threat Detection 146 may use Supervised Learning method(s) utilizing a labelled set of threat database 315. FIG. 3 also illustrates at 320, the ML training of the Anomaly Detection module 147 through Unsupervised Learning principles utilizing a clean slate lab environment and/or normal traffic operation (see 325). Also shown in FIG. 3, there is shown at 330, a preferred methodology of training machine learning aspects or components of the DAE 140. As set out herein, the ML training of the DAE 140 may use Supervised Learning method(s) utilizing a labelled set of threat database and/or deep learning method(s) utilizing a labelled set of threat database (see 335).

FIG. 3 also illustrates at 340, a preferred aspect of the invention wherein the ML prediction for the DAE 140 may utilizing a layered, decision tree based and/or consecutive analytics approach, an example of which may further comprises convolutional neural networks, recurrent neural networks, and/or decision tree analytics as described herein (see 345).

Another aspect of the present invention is provided in FIG. 4. As shown in FIG. 4, there is illustrated a device 400 of the present invention. Device 400 combines the following components: (a) one or more traffic aggregators 410; (b) one or more protocol category splitters 420; and (c) one or more the IDS Agent(s) 430 to perform the above described processes. In a preferred embodiment, there are provided one or more Ethernet ports 450 where one or more IEDs and/or other end devices (not shown) may connect to Line Cards 440. In a preferred embodiment, cards 440 may be interconnected through the backplane utilizing one or more Switch Fabric 460. FIG. 4 shows a preferred embodiment wherein Traffic Aggregator(s) 410 may be integral with device 400 so as to connect aggregated traffic to one or more configurable Protocol Category Splitters 420. In a preferred embodiment, based on the Protocol Category Splitter(s) configuration, Protocol Category Splitter(s) 420 separates traffic received from the Traffic Aggregator(s) into Protocol Categories. Based on the Protocol Category of the traffic, the traffic is forwarded to the respective IDS Agent 430*a*, 430*b*, 430*c*, etc. Also in a preferred embodiment both the Traffic Aggregator(s) 410 and the Protocol Category Splitter(s) 420 may operate at wire-speed while the Traffic Aggregator(s) mirrors traffic without impacting, delaying or interrupting communication between end devices (e.g. network elements (e.g. computers, etc.) and control elements (e.g. IEDs, etc.)).

As shown in FIG. 5, there is provided an embodiment 500 of the system of the present invention implemented across one or more critical infrastructure sites ("CIS"), such as 510, 520 and 530. Each CIS provides therein one or more devices 400*a*, 400*b* and 400*c*, to which may connect one or more IEDs (540, 541)) and/or end devices (550, 551). It will be understood that there may be provided multiple devices 400 within each site 510, 520 or 530. As shown in FIG. 5, there is provided one or more Control Rooms 560 functionally connected to each site 510, 520 and 530 and, in a preferred embodiment, the devices 400 within the CIS 510, 520 and 530, to facilitate the proper operation of the system. The Control Room 560 functions to provide supervision and control functions for the sites in the accordance with the description of the present invention provided herein. In a preferred embodiment, the DAE 140 and the SIEM 150 may exist as a centralized function within the control room 560 while the GTI 160 may be, in a preferred embodiment, located separate from the Control Room 560.

Although this disclosure has described and illustrated certain preferred embodiments. As shown in FIG. 1, in a second situation, of the invention, it may be to be understood that the invention may be not restricted to those embodiments. Rather, the invention includes all embodiments which are functional or mechanical equivalence of the specific embodiments and features that have been described and illustrated.

I claim:

1. A system for intrusion detection for network and control elements used in a mission critical environment connected to a network, the system comprising:
   (a) a traffic aggregator module for mirroring and aggregating network traffic;
   (b) a protocol category splitter module for receiving the mirrored and aggregated network traffic from the traffic aggregator and for splitting the mirrored and aggregated network traffic into a first and second protocol category;
   (c) a first and second intrusion detection system (IDS) module for the first and second protocol categories, the first intrusion detection system module for analyzing the mirrored and aggregated network traffic from the first protocol category and for transmitting a first IDS associated data and the second intrusion detection system module for analyzing the mirrored and aggregated network traffic from the second protocol category and for transmitting a second IDS associated data;

(d) a first and second security information and event management (SIEM) module for each of the first and second protocol categories, the first SIEM module for processing the first IDS associated data to make a first protocol category alert available to a user and the second SIEM module for processing the second IDS associated data to make a second protocol category alert available to the user; and (e) a first and second global threat intelligence platform (GTI) for the first and second IDS modules, comprising:

(i) the first GTI for receiving the first IDS associated data and further analyzing the first IDS associated data for transmitting a first GTI response data to the first IDS module, the first IDS module utilizing the first GTI response data in the analyzing of the mirrored and aggregated network traffic of the first protocol category by the first IDS module; and (ii) the second GTI for receiving the second IDS associated data and further analyzing the second IDS associated data for transmitting a second GTI response data to the second IDS module, the second IDS module utilizing the second GTI response data in the analyzing of the mirrored and aggregated network traffic of the second protocol category by the second IDS module;

wherein the first and second IDS associated data each comprises alerts data and analytics data; and wherein the first and second SIEM module receive the first and second alerts data of the first and second IDS associated data.

2. The system of claim 1 wherein the first and second GTI module receive the first and second analytics data of the first and second IDS associated data.

3. The system of claim 1 further comprising a first and second deep analytics engine (DAE) module for receiving the first and second IDS agent data and for transmitting a first and second DAE data; wherein the first and second IDS agent further comprises a first and second packet analyzer for analyzing and normalizing the mirrored and aggregated network traffic of the first and second protocol categories and for transmitting a first and second packet analyzer data.

4. The system of claim 3 wherein the first and second packet analyzer data is further comprised of a first and second potential threat data and a first and second potential anomaly data.

5. The system of claim 4 wherein the first and second IDS agent further comprises a first and second threat detection module for the receiving and analyzing the first and second potential threat data, and for transmitting the first and second threat detection data.

6. The system of claim 5 wherein the first and second IDS agent further comprises a first and second anomaly detection module for receiving and analyzing the first and second potential anomaly data, and for transmitting the first and second anomaly detection data.

7. The system of claim 6 wherein the first and second anomaly detection data is transmitted to the first and second DAE modules for further analysis to produce the first and second DAE data.

8. The system of claim 3 wherein at least one of the first and second DAE modules exists as a centralized function at a control room level.

9. The system of claim 1 wherein at least one of the first and second GTI modules exist as a centralized function.

10. The system of claim 3 wherein the first and second packet analyzer modules analyze and normalize the mirrored and aggregated network traffic and based on the results thereof directs potential threats to at least one of the first and second threat detection modules and potential anomalies to at least one of the first and second anomaly detection modules.

11. The system of claim 4 wherein at least one of the first and second threat detection modules receives at least one of the first and second packet analyzer data for performing analytics to confirm a first threat and where the first threat has been detected, the at least one of the first and second threat detection modules issues a first threat alert.

12. The system of claim 5 wherein at least one of the first and second anomaly detection modules receives at least one of the first and second packet analyzer data for performing analytics to confirm an anomaly and where the anomaly has been detected, the at least one of the first and second anomaly detection modules issues an anomaly alert.

13. The system of claim 3 wherein at least one of the first and second DAE modules receives at least one of the first and second IDS associated data for performing further analytics to confirm a second threat and where the second threat has been detected, the at least one of the first and second DAE modules issues a second threat alert.

14. The system of claim 5 wherein at least one of the first and second threat detection modules utilizes a supervised learning training technique using a labelled threat database data set.

15. The system of claim 6 wherein at least one of the first and second anomaly detection modules utilizes an unsupervised learning training technique using a clean slate data set from a lab environment and/or normal traffic operation.

16. The system of claim 3 wherein at least one of the first and second DAE modules during the prediction process utilizes: (i) convolutions neural networks for deep and layered analytics; (ii) recurrent neural networks for consecutive conclusive analytics; and/or (iii) decision trees based analytics.

17. A method for intrusion detection for network and control elements used in a mission critical environment connected to a network, the method comprising:

(a) mirroring and aggregating network traffic from the network;

(b) splitting the mirrored and aggregated network traffic from step (a) into a first and second protocol category network traffic;

(c) analyzing the first protocol category network traffic from step (b) and transmitting a first IDS associated data and analyzing the second protocol category network traffic from step (b) and transmitting a second IDS associated data; and (d) processing the first and second IDS associated data from step (c) for each of the first and second protocol categories to determine whether to make a first or second protocol category alert available to a user;

wherein the analysis of step (c) further comprises:

(i) analyzing the first and second mirrored and aggregated network traffic from the first and second protocol categories and transmitting a first and second IDS agent data;

(ii) analyzing and normalizing the mirrored and aggregated network traffic of the first and second protocol categories of step (b) and transmitting a first and second packet analyzer data where a potential threat or potential anomaly has been detected; and (iii) receiving and analyzing the first and second potential threat data, and transmitting the first and second threat detection data; and wherein the first and second packet analyzer data is further comprised of a first and second potential threat data upon detection of the potential threat and a first and second potential anomaly data upon detection of the potential threat.

18. The method of claim 17 wherein the analysis of step (c) further comprises receiving and analyzing the first and second packet potential anomaly data, and transmitting the first and second anomaly detection data.

19. The method of claim 18 wherein the first and second anomaly detection data is further analyzed to produce a first and second DAE data.

20. The process of claim 18 wherein step (c) receives at least one of the first or second anomaly detection data and performs further analytics to determine whether to transmit a first or second protocol category alert.

21. The method of claim 20 wherein if the further analytics cannot determine whether to transmit a first or second protocol category alert, then step (c) further comprises analyzing at least one of the first or second DAE data to produce a GTI response data, the GTI response data utilized in further analyzing the least one of the first or second anomaly detection data to determine whether to transmit a first or second protocol category alert.

22. The method of claim 17 wherein step (c) employs machine learning and utilizes a supervised learning training technique using a labelled threat database data set.

23. The method of claim 18 wherein step (c) employs machine learning and utilizes an unsupervised learning training technique using a clean slate data set from a lab environment and/or normal traffic operation.

24. The method of claim 19 wherein step (c) employs machine learning and during the training process utilizes (i) supervised learning techniques with a labeled threat data set; and/or (ii) deep neural networks can be utilized for feature extraction.

25. The method system of claim 19 wherein step (c) employs machine learning and during the prediction process utilizes: (i) convolutions neural networks for deep and layered analytics; (ii) recurrent neural networks for consecutive conclusive analytics; and/or (iii) decision trees based analytics.

26. A device for intrusion detection for network and control elements used in a mission critical environment connected to a network, the device comprising:

(a) an Ethernet switch;
(b) a traffic aggregator module connected to the Ethernet switch for mirroring and aggregating network traffic;
(c) a protocol category splitter module connected to the traffic aggregator for receiving the mirrored and aggregated network traffic from the traffic aggregator and splitting the mirrored and aggregated network traffic into a first and second protocol category; and
(d) a first and second intrusion detection system (IDS) module for the first and second protocol categories, the first intrusion detection system module for analyzing the mirrored and aggregated network traffic from the first protocol category and for transmitting a first IDS associated data and the second intrusion detection system module for analyzing the mirrored and aggregated network traffic from the second protocol category and for transmitting a second IDS associated data;

wherein the first and second IDS associated data is processed to determine whether to make a first or second protocol category alert available to a user;

wherein the first and second IDS associated data each comprises alerts data and analytics data;

wherein the first and second IDS module further comprises a first and second IDS agent module for analyzing the first and second mirrored and aggregated network traffic from the first and second protocol categories and for transmitting a first and second IDS agent data;

wherein the first and second IDS agent further comprises:
(i) a first and second packet analyzer for analyzing and normalizing the mirrored and aggregated network traffic of the first and second protocol categories and for transmitting first and second packet analyzer data; and
(ii) a first and second threat detection module for the receiving and analyzing the first and second potential threat data, and for transmitting the first and second threat detection data; and wherein the first and second packet analyzer data is further comprised of a first and second potential threat data and a first and second potential anomaly data.

27. The device of claim 26 wherein the first and second IDS agent further comprises a first and second anomaly detection module for receiving and analyzing the first and second potential anomaly data, and for transmitting the first and second anomaly detection data.

28. The device of claim 27 wherein the device further comprises a first and second deep analytics engine (DAE) module for receiving the first and second IDS anomaly detection data and for further analyzing the first and second IDS anomaly detection data and transmitting a first and second DAE data.

29. The device of claim 27 wherein the first and second packet analyzer modules for analyzing and normalizing the mirrored and aggregated network traffic and based on the results of the analysis directs potential threats to at least one of the first and second threat detection modules and potential anomalies to at least one of the first and second anomaly detection modules.

30. The device of claim 26 wherein at least one of the first and second threat detection modules receives at least one of the first and second potential threat data for performing analytics to confirm a first threat and where the first threat has been detected, the at least one of the first and second threat detection modules issues a first threat alert.

31. The device of claim 27 wherein at least one of the first and second anomaly detection modules receives at least one of the first and second potential anomaly data for performing analytics to confirm an anomaly and where the anomaly has been detected, the at least one of the first and second anomaly detection modules issues an anomaly alert.

32. The device of claim 28 wherein at least one of the first and second DAE modules receives at least one of the first and second IDS agent associated data for performing further analytics to confirm a threat and where the threat has been detected, the at least one of the first and second DAE modules issues a threat alert.

33. The device of claim 26 wherein at least one of the first and second threat detection modules utilizes a supervised learning training technique using a labelled threat database data set.

34. The device of claim 27 wherein at least one of the first and second anomaly detection modules utilizes an unsupervised learning training technique using a clean slate data set from a lab environment and/or normal traffic operation.

35. The device of claim 28 wherein at least one of the first and second DAE modules during the training process utilizes (i) supervised learning techniques with a labeled threat data set; and/or (ii) deep neural networks can be utilized for feature extraction.

36. The device of claim 28 wherein at least one of the first and second DAE modules during the prediction process utilizes: (i) convolutions neural networks for deep and layered analytics; (ii) recurrent neural networks for consecutive conclusive analytics; and/or (iii) decision trees based analytics.

37. The device of claim 26 wherein the Ethernet switch further comprises an Ethernet line card connected to a switch fabric, wherein the switch fabric further comprises a switch backplane; and wherein the traffic aggregator is connected to the switch backplane, is configurable to selectively mirrors traffic of at least one port in both the ingress and egress directions, and has no impact on traffic between end devices.

* * * * *